(12) United States Patent
Shimizu (10) Patent No.: US 7,254,333 B2
(45) Date of Patent: Aug. 7, 2007

(54) LOW-COST WDM TERMINAL DEVICE ACCOMMODATING PLURALITY OF CLIENT SIGNAL

(75) Inventor: Takayuki Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 311 days.

(21) Appl. No.: 09/960,503

(22) Filed: Sep. 24, 2001

(65) Prior Publication Data

US 2002/0135836 A1 Sep. 26, 2002

(30) Foreign Application Priority Data

Mar. 26, 2001 (JP) ............................. 2001-088565

(51) Int. Cl.
H04J 14/02 (2006.01)

(52) U.S. Cl. ............................. 398/79; 398/81; 398/83; 398/158; 398/159; 398/147; 398/148; 398/91; 398/92; 398/160; 398/165; 398/68; 385/24; 385/37

(58) Field of Classification Search .................. 398/79, 398/81, 158, 159, 165, 68, 83, 147, 148, 398/160, 91, 92; 385/24, 37
See application file for complete search history.

(56) References Cited

U.S. PATENT DOCUMENTS

| | | | |
|---|---|---|---|
| 5,587,830 A | | 12/1996 | Chraplyvy et al. |
| 5,712,936 A | * | 1/1998 | Hoag et al. ................... 385/24 |
| 5,719,696 A | | 2/1998 | Chraplyvy et al. |
| 5,801,861 A | | 9/1998 | Majima |
| 5,831,761 A | | 11/1998 | Chraplyvy et al. |
| 5,938,309 A | * | 8/1999 | Taylor .......................... 398/79 |
| 5,999,290 A | * | 12/1999 | Li ................................. 398/83 |
| 6,011,892 A | | 1/2000 | Chraplyvy et al. |
| 6,084,694 A | * | 7/2000 | Milton et al. .................. 398/83 |
| 6,205,268 B1 | | 3/2001 | Chraplyvy et al. |
| 6,271,948 B1 | * | 8/2001 | Toyohara ........................ 398/9 |
| 6,323,994 B1 | * | 11/2001 | Li et al. ................... 359/341.1 |
| 6,388,782 B1 | * | 5/2002 | Stephens et al. .............. 398/79 |

(Continued)

FOREIGN PATENT DOCUMENTS

JP 5-083255 4/1993

(Continued)

OTHER PUBLICATIONS

Japanese Patent Office Action mailed Jan. 10, 2006, corresponding to Japanese Patent Application No. 2001-088565.

Primary Examiner—Hanh Phan
(74) Attorney, Agent, or Firm—Staas & Halsey LLP (57) ABSTRACT

A WDM (Wavelength Division Multiplex) terminal device located in a WDM network includes a multiplexing unit that multiplexes a wavelength of a client signal having a single wavelength or a wavelength of at least one of a first plurality of client signals whose wavelengths are multiplexed, to wavelengths of a second plurality of client signals received with their wavelengths being multiplexed, and transmits the second plurality of client signals. Thus, the WDM terminal device can multiplex wavelengths of a plurality of client signals received from a metro WDM terminal device located at a distant place, to a wavelength of another client signal without separating the plurality of client signals by each wavelength, thereby achieving accommodation of a plurality of client signals whose wavelengths are multiplexed, at low cost.

3 Claims, 6 Drawing Sheets

U.S. PATENT DOCUMENTS

| | | | |
|---|---|---|---|
| 6,445,850 B1 * | 9/2002 | Zhou et al. | 385/24 |
| 6,512,613 B1 | 1/2003 | Tanaka et al. | |
| 6,563,978 B2 * | 5/2003 | Matsuoka et al. | 385/24 |
| 6,731,877 B1 * | 5/2004 | Cao | 398/91 |
| 7,061,657 B1 * | 6/2006 | Fishman et al. | 398/74 |

FOREIGN PATENT DOCUMENTS

| | | |
|---|---|---|
| JP | 9-215072 | 8/1997 |
| JP | 9-222381 | 8/1997 |
| JP | 09-247106 | 9/1997 |
| JP | 10-13356 | 1/1998 |
| JP | 10-41889 | 2/1998 |
| JP | 10-084332 | 3/1998 |
| JP | 11-98087 | 4/1999 |
| JP | 11-150527 | 6/1999 |
| JP | 11-168449 | 6/1999 |
| JP | 11-218790 | 8/1999 |
| JP | 11-234216 | 8/1999 |
| JP | 11-289296 | 10/1999 |
| JP | 2000-244404 | 9/2000 |
| JP | 2001-069082 | 3/2001 |
| WO | WO 99/49601 | 9/1999 |

* cited by examiner

LOW-COST WDM TERMINAL DEVICE ACCOMMODATING PLURALITY OF CLIENT SIGNAL

BACKGROUND OF THE INVENTION

1. Field of the Invention

The present invention relates to a WDM (Wavelength Division Multiplex) terminal device and a WDM network. More particularly, the present invention relates to a WDM terminal device accommodating a client signal in a WDM network, and the WDM network.

2. Description of the Related Art

According to a related art, accommodation of a client signal to a WDM system is performed separately for each wave, by use of an optical fiber corresponding to the wave. All the client signals are initially converted from a light-signal format to an electric-signal format, and, then, converted from the electric-signal format to a light-signal format, by a transponder, inside or near the WDM system. Subsequently, all the client signals are accommodated in the WDM system. The above-described steps are performed because a wavelength of each client signal supplied to the WDM system is different from a wavelength of each client signal inside the WDM system.

Two types of methods are taken for accommodating a plurality of client signals located at a distant place, according to the related art. According to a first method shown in FIG. 1, client signals to be accommodated in a WDM system are transmitted separately by use of optical fibers whose number is equal to the number of the client signals, from the distant place to the WDM system. Subsequently, the client signals are accommodated in WDM terminal devices 10 or 11, or a WDM-ADM (Add-Drop Multiplexer) device 12 of the WDM system, through a transponder.

Figure 2:
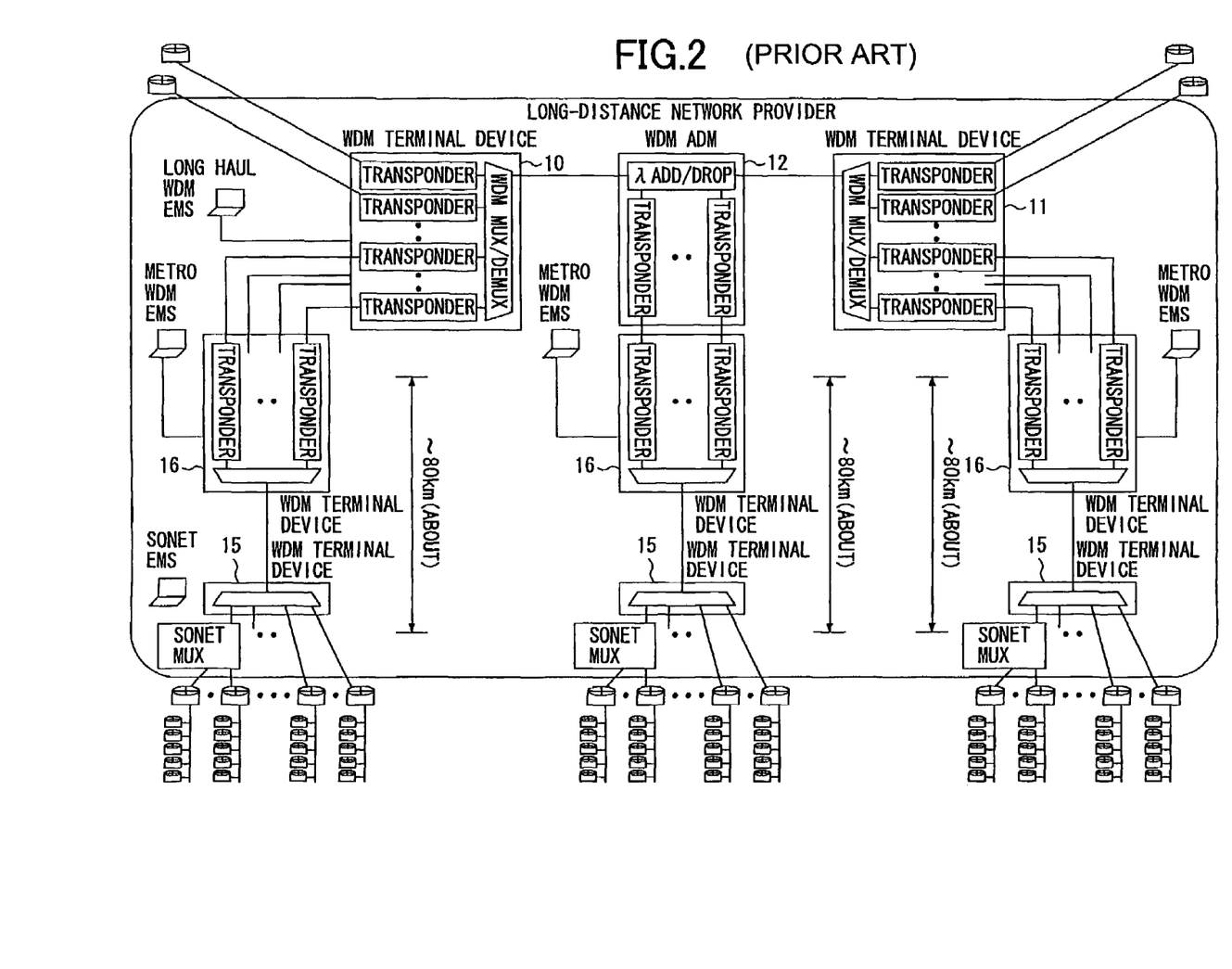
FIG. 2 is a diagram showing a system structure of another related-art WDM system.

On the other hand, according to a second method shown in FIG. 2, a WDM terminal device 15 of a small-capacity WDM system initially carries out wavelength multiplexing to client signals at a distant place. Subsequently, the WDM terminal device 15 transmits the client signals closer to a WDM system that accommodates the client signals at the end. Next, a WDM terminal device 16 of the small WDM system separates the client signals by each wave. Finally, the client signals are accommodated in the WDM terminal devices 10 or 11, or the WDM-ADM device 12 of the WDM system.

Figure 1:
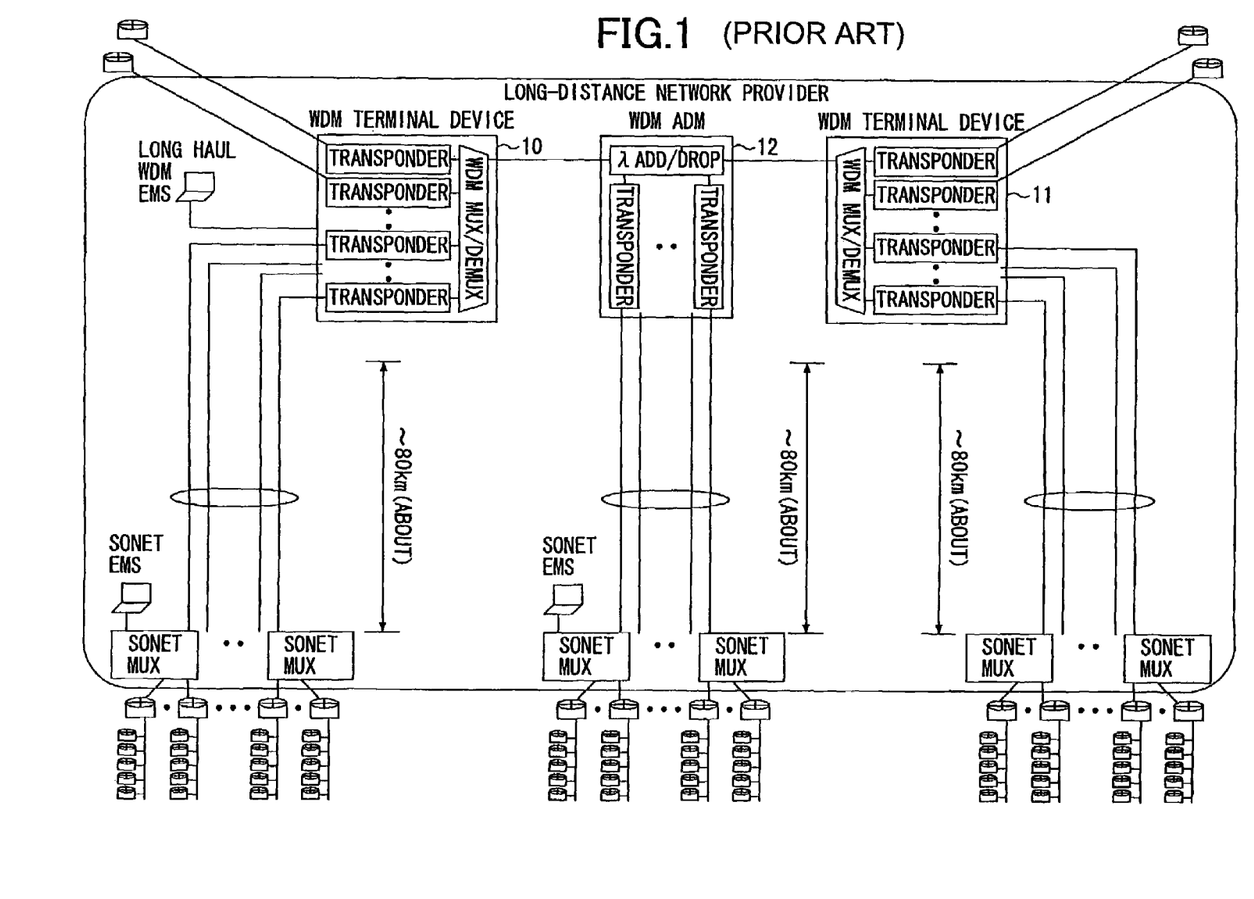
FIG. 1 is a diagram showing a system structure of a related-art WDM system.

For example, a wavelength-multiplexed signal having tens of channels is transmitted or received between the WDM terminal devices 10 or 11, and the WDM-ADM device 12 at a 0.4 nm interval through a band whose wavelength is 1500 nm. On the other hand, a wavelength-multiplexed signal having several to ten odd channels is transmitted or received between the WDM terminal devices 15 and 16, at a 1.6 nm interval through a band whose wavelength is 1500 nm, for instance.

Additionally, in the related art, system setting and management are independently performed to each of a long-distance WDM system, a middle or short distance WDM system and a MUX (Multiplexer) of a SONET (Synchronous Optical Network) system by use of its own EMS (Element Management System) and data link. Therefore, in a case in which a client constructs a network by combining each system, complicated management of the entire network by use of a plurality of EMSs is necessary.

Additionally, according to the first method, optical fibers whose number is equal to the number of the client signals to be accommodated are necessarily placed or leased between the distant place and the WDM system. Thus, a cost of achieving the fist method is high.

Further, according to the second method, the WDM terminal devices 15 and 16 of the small-capacity WDM system are necessarily placed at two positions right before the distant place and the WDM system accommodating the client signals at the end. Consequently, a cost of achieving the second method is also high.

SUMMARY OF THE INVENTION

Accordingly, it is a general object of the present invention to provide a WDM (Wavelength Division Multiplexed) terminal device and a WDM network. A more particular object of the present invention is to provide a WDM terminal device and a WDM network that can accommodate a plurality of client signals from a distant place at low cost.

The above-described object of the present invention is achieved by a WDM terminal device located in a WDM network, through which a plurality of client signals are transmitted with their wavelengths being multiplexed, the WDM terminal device including a first compensator that collectively compensates dispersion of each wavelength of a first plurality of client signals received through the WDM network with their wavelengths being multiplexed; a transmission amplifier that collectively adjusts levels of the first plurality of client signals; and a multiplexing unit that multiplexes a wavelength of a client signal having a single wavelength or a wavelength of at least one of a second plurality of client signals whose wavelengths are multiplexed, to wavelengths of the first plurality of client signals, and transmits the first plurality of client signals.

Thus, the WDM terminal device can multiplex wavelengths of a plurality of client signals received from a metro WDM terminal device located at a distant place, to a wavelength of another client signal without separating the plurality of client signals by each wavelength, thereby achieving accommodation of a plurality of client signals whose wavelengths are multiplexed, at low cost.

Another object of the present invention is to provide a WDM network, in which a single EMS (Element Management System) can carry out system setting and management of all WDM terminal devices, WDM-ADM (Add-Drop Multiplexer) devices, and SONET (Synchronous Optical Network) devices connected to the WDM devices, in the WDM network.

The above-described object of the present invention is achieved by a WDM network, through which a plurality of client signals are transmitted with their wavelengths being multiplexed, the WDM network comprising a provisioning unit that is connected to a WDM terminal device, and carries out provisioning to all WDM terminal devices, WDM-ADM devices, and SONET devices connected to the WDM devices, in the WDM network.

Other objects, features and advantages of the present invention will become more apparent from the following detailed description when read in conjunction with the accompanying drawings.

DESCRIPTION OF THE PREFERRED EMBODIMENTS

A description will now be given of preferred embodiments of the present invention, with reference to the accompanying drawings.

Figure 3:
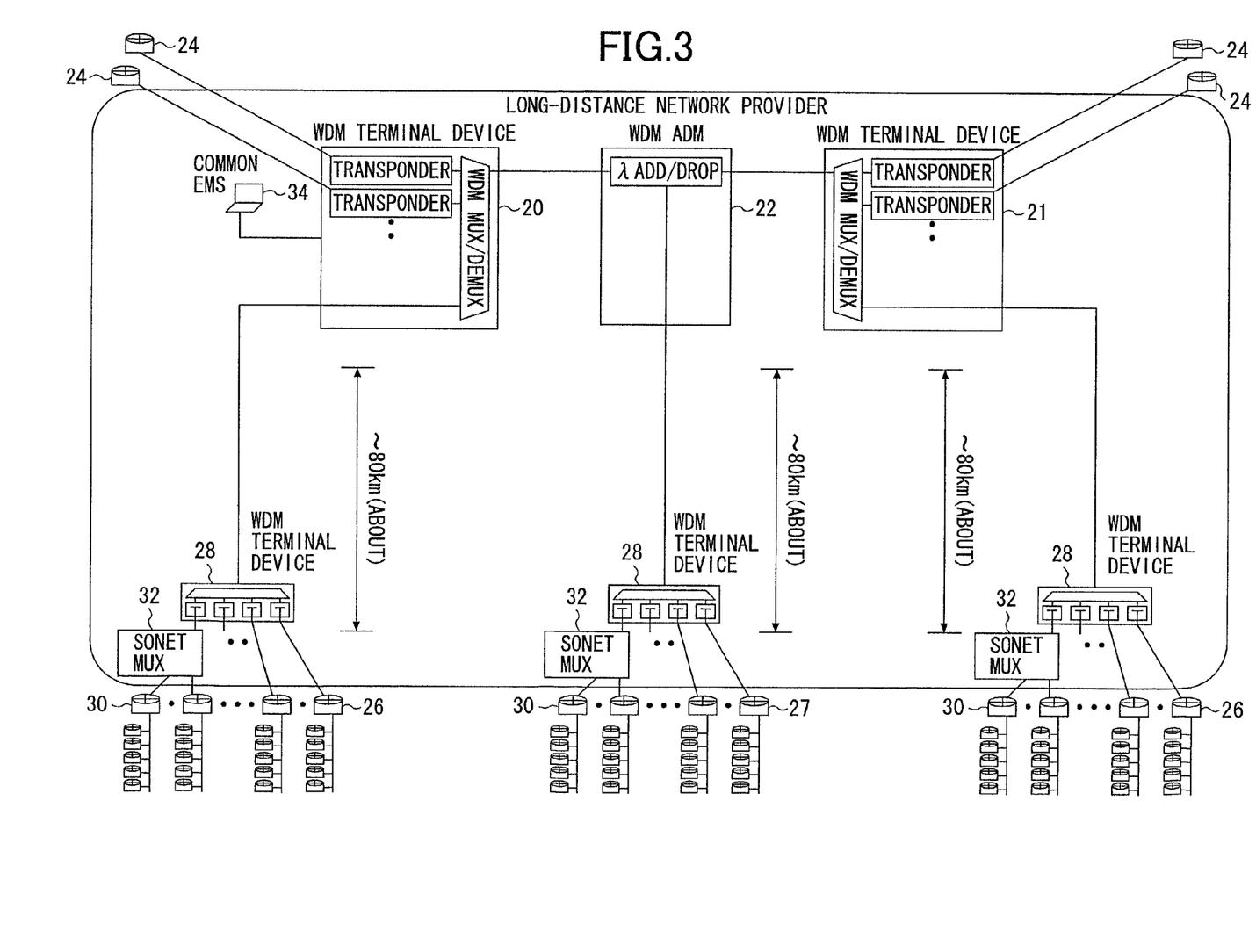
FIG. 3 is a diagram showing a system structure of a WDM system according to an embodiment of the present invention.

FIG. 3 shows a system structure of a WDM system according to an embodiment of the present invention. As shown in FIG. 3, a long-haul WDM system includes long-haul WDM terminal devices 20 and 21, a WDM-ADM device 22 and an optical fiber. The optical fiber connects the long-haul WDM terminal devices 20 and 21, with the WDM-ADM device 22. A client signal from a router 24 is transmitted through an optical fiber, and is accommodated through a transponder in the long-haul WDM terminal devices 20 or 21.

At a distant place, a client signal from routers 26 and 27 is transmitted through an optical fiber, and is accommodated through a transponder in a metro WDM terminal device 28 that composes a metro WDM system. Additionally, a client signal from a router 30 is transmitted through an optical fiber, and is multiplexed by a MUX (SONET-MUX) 32 of a SONET system. Subsequently, the multiplexed client signal is accommodated through a transponder in the metro WDM terminal device 28.

The metro WDM terminal device 28 carries out wavelength multiplexing to the accommodated client signal, and transmits the multiplexed client signal to the long-haul WDM terminal devices 20 and 21, and the WDM-ADM device 22. Subsequently, the long-haul WDM terminal devices 20 and 21, and the WDM-ADM device 22 accommodate the multiplexed client signal.

The metro WDM terminal device 28 transmits or receives a wavelength-multiplexed signal having several to ten odd channels through a band whose wavelength is 1500 nm, at a 0.4 nm interval. The long-haul WDM terminal devices 20 and 21, and the WDM-ADM device 22 transmit or receive a wavelength-multiplexed signal having tens of channels through a band whose wavelength is 1500 nm, at a 0.4 nm interval. Any client signals are transmitted between the metro WDM system and the long-haul WDM system at a same wavelength. In other words, a light signal whose wavelength is multiplexed by the metro WDM terminal device 28 is accommodated in the long-haul WDM system without going through a transponder, or without being converted from a light-signal format through an electric-signal format to another light-signal format.

Additionally, the long-haul WDM terminal device 20 is connected with a common EMS terminal device 34. The common EMS terminal device 34 carries out network setting and manages the long-haul WDM terminal devices 20 and 21, the WDM-ADM device 22, the metro WDM terminal device 28 and the SONET-MUX 32, collectively. It should be noted that the common EMS terminal device 34 could be connected to the long-haul WDM terminal device 21 or the WDM-ADM device 22 instead of the long-haul WDM terminal device 20.

Figure 4:
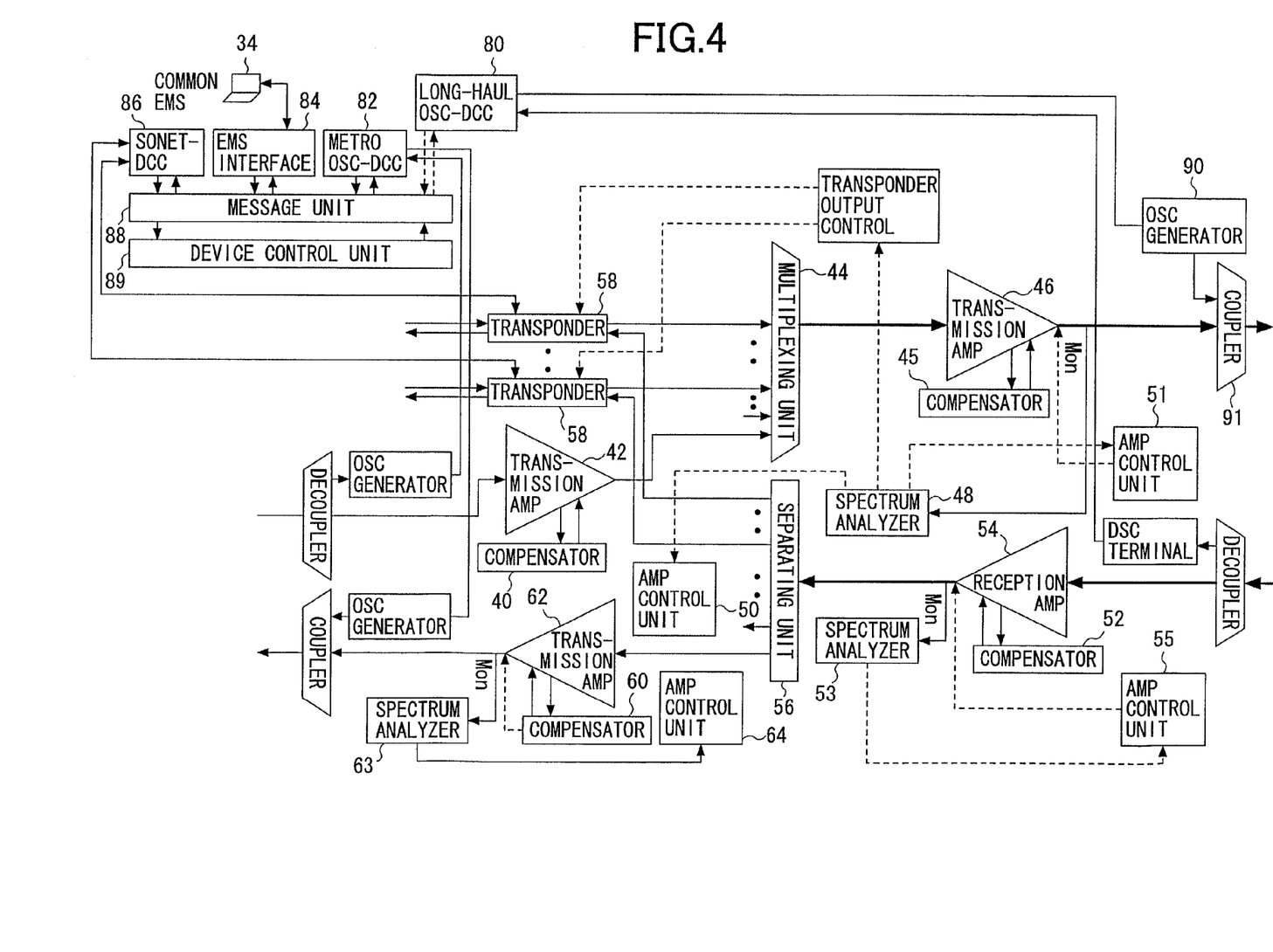
FIG. 4 is a block diagram showing a structure of a long-haul WDM terminal device.

FIG. 4 is a block diagram showing a structure of the long-haul WDM terminal devices 20 and 21. In FIG. 4, a client-signal flow and a control-signal flow are indicated as a solid line and a broken line, respectively.

As shown in FIG. 4, a plurality of client signals (WDM client signals) whose wavelengths are multiplexed and are transmitted from a distant place by the metro WDM system are supplied to a WDM collective transmission amplifier (a transmission amp) 42. A plural-wavelengths collective dispersion compensator (a compensator) 40 provided next to the WDM collective transmission amplifier 42 compensates dispersion accumulated by the metro WDM transmission to a level suitable for the next long-haul WDM transmission. The WDM collective transmission amplifier 42 adjusts the WDM client signals processed through dispersion compensation to an output level appropriate as an input to a wavelength-multiplexing unit (a multiplexing unit) 44.

An amplifier control unit (an amp control unit) 50 controls the output level of the WDM collective transmission amplifier 42, based on a result of monitoring an output of a WDM collective transmission amplifier (a transmission amp) 46 by using a spectrum analyzer 48. Similarly, an amplifier control unit (an amp control unit) 51 controls an output level of the WDM collective transmission amplifier 46, based on the monitoring result of the spectrum analyzer 48.

The WDM client signals whose output levels are adjusted by the WDM collective transmission amplifier 42 are inputted to the wavelength-multiplexing unit 44. Subsequently, the wavelength-multiplexing unit 44 multiplexes wavelengths of the WDM client signals supplied from the WDM collective transmission amplifier 42, with other WDM client signals or client signals accommodated separately for each wave through transponders 58. The WDM client signals are, then, processed through level adjustment at the WDM collective transmission amplifier 46, and dispersion compensation at a plural-wavelengths collective dispersion compensator (a compensator) 45 for securing the next WDM transmission performance. Subsequently, the WDM client signals are transmitted to a long-haul WDM network.

On the other hand, a WDM signal transmitted through the long-haul WDM network is supplied to a WDM collective reception amplifier (a reception amp) 54. A plural-wavelengths collective dispersion compensator (a compensator) 52 compensates dispersion of the WDM signal accumulated by the long-haul WDM transmission. Additionally, the WDM collective reception amplifier 54 adjusts a level of the WDM signal. Subsequently, a variable-separation-wavelength-separating unit (a separating unit) 56 separates the WDM signal.

The variable-separation-wavelength-separating unit 56 can freely separate the WDM signal into one or a plurality of wavelength-multiplexed signals, according to setting. A signal separated by a single wave is transmitted through the transponder 58 to a client side (via a router).

A plurality of WDM signals to be transmitted to a distant place with their wavelengths being multiplexed are separated by the variable-separation-wavelength-separating unit 56. Subsequently, a WDM collective transmission amplifier (a transmission amp) 62 amplifies the WDM signals to a level appropriate for the next metro WDM transmission. Additionally, a plural-wavelength collective dispersion compensator (a compensator) 60 carries out dispersion compensation to the WDM signals, in order to insure the next WDM transmission performance. The WDM signals are, then, transmitted to a metro WDM network.

An amplifier control unit (an amp control unit) 55 controls an output level of the WDM collective reception amplifier 54, based on a result of monitoring an output of the WDM collective reception amplifier 54 by using a spectrum analyzer 53. Additionally, an amplifier control unit (an amp control unit) 64 controls an output level of the WDM collective transmission amplifier 62, based on a result of monitoring an output of the WDM collective transmission amplifier 62 by using a spectrum analyzer 63.

Figure 5:
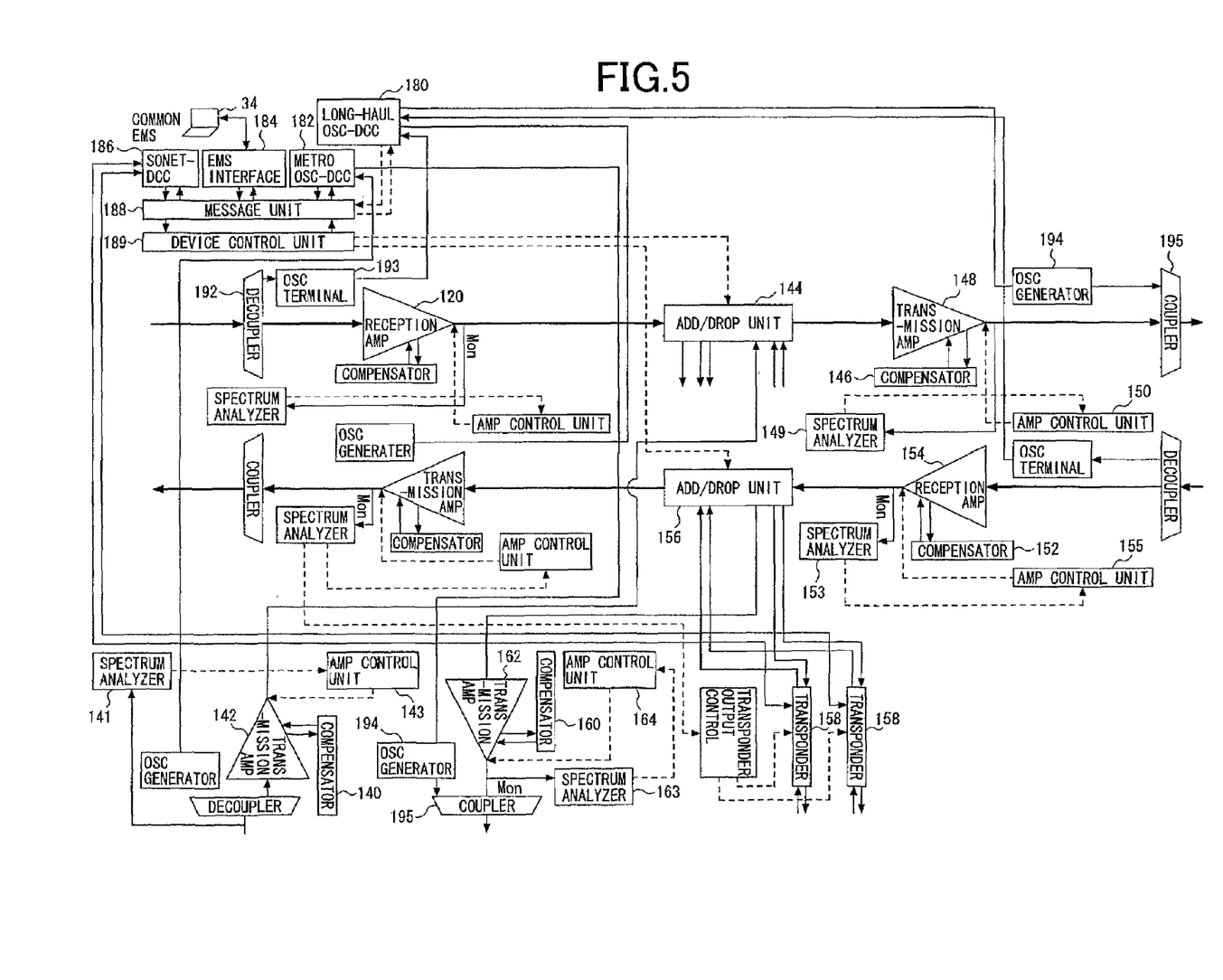
FIG. 5 is a block diagram showing a structure of a WDM-ADM device.

FIG. 5 is a block diagram showing a structure of the WDM-ADM device 22. A plurality of client signals (WDM client signals) whose wavelengths are multiplexed and are transmitted by the metro WDM system from a distant place are supplied to a WDM collective transmission amplifier (a transmission amp) 142. A plural-wavelengths collective dispersion compensator (a compensator) 140 provided next to the WDM collective transmission amplifier 142 compensates dispersion accumulated by the metro WDM transmission to a level appropriate for the next long-haul WDM transmission.

The WDM collective transmission amplifier 142 adjusts the WDM client signals processed through dispersion compensation to an output level appropriate as an input to a variable-separation-wavelength add/drop unit (an add/drop unit) 144. An amplifier control unit (an amp control unit) 143 controls the output level of the WDM collective transmission amplifier 142, based on a result of monitoring an output of the WDM collective transmission amplifier 142 by using a spectrum analyzer 141.

The variable-separation-wavelength add/drop unit 144 adds (carries out wavelength multiplexing) the WDM client signals whose output levels have been adjusted, to a wavelength of a signal that passes through the WDM-ADM device 22 and is supplied from the long-haul WDM terminal device 20 through a WDM collective reception amplifier (a reception amplifier) 120, with other WDM client signals or client signals accommodated for each wave.

A plural-wavelengths collective dispersion compensator (a compensator) 146 and a WDM collective transmission amplifier (a transmission amp) 148 carry out dispersion compensation and appropriate level adjustment, respectively, to a group of signals obtained by the above-described addition, for securing the next WDM transmission performance. Subsequently, the group of signals is transmitted to the long-haul WDM network. An amplifier control unit (an amp control unit) 150 controls an output level of the WDM collective transmission amplifier 148, based on a result of monitoring an output of the WDM collective transmission amplifier 148 by using a spectrum analyzer 149.

On the other hand, a plural-wavelengths collective dispersion compensator (a compensator) 152 compensates dispersion of a WDM signal transmitted from the long-haul WDM terminal device 21 through the long-haul WDM network, in which the dispersion is accumulated by the long-haul WDM transmission. Additionally, a WDM collective reception amplifier (a reception amp) 154 adjusts a level of the WDM signal. Subsequently, the WDM signal is supplied to a variable-separation-wavelength add/drop unit (an add/drop unit) 156, where a wavelength to be dropped at an own node (the WDM-ADM device 22) is separated.

The variable-separation-wavelength add/drop unit 156 can freely set a signal to be separated from the WDM signal, to one or a plurality of wavelengths. A signal separated by a single wave is transmitted to a client side through a transponder 158.

A plurality of wavelength-multiplexed signals to be transmitted to a distant place, after being separated from the WDM signal, are amplified by a WDM collective transmission amplifier (a transmission amp) 162 to a level appropriate for the next metro WDM transmission. Subsequently, a plural-wavelengths collective dispersion compensator (a compensator) 160 compensates dispersion of the plurality of wavelength-multiplexed signals, for securing the next WDM transmission performance. The plurality of wavelength-multiplexed signals are, then, transmitted to the metro WDM network.

An amplifier control unit (an amp control unit) 155 controls an output level of the WDM collective reception amplifier 154, based on a result of monitoring an output of the WDM collective reception amplifier 154 by using a spectrum analyzer 153. Additionally, an amplifier control unit (an amp control unit) 164 controls an output level of the WDM collective transmission amplifier 162, based on a result of monitoring an output of the WDM collective transmission amplifier 162 by using a spectrum analyzer 163.

Figure 6:
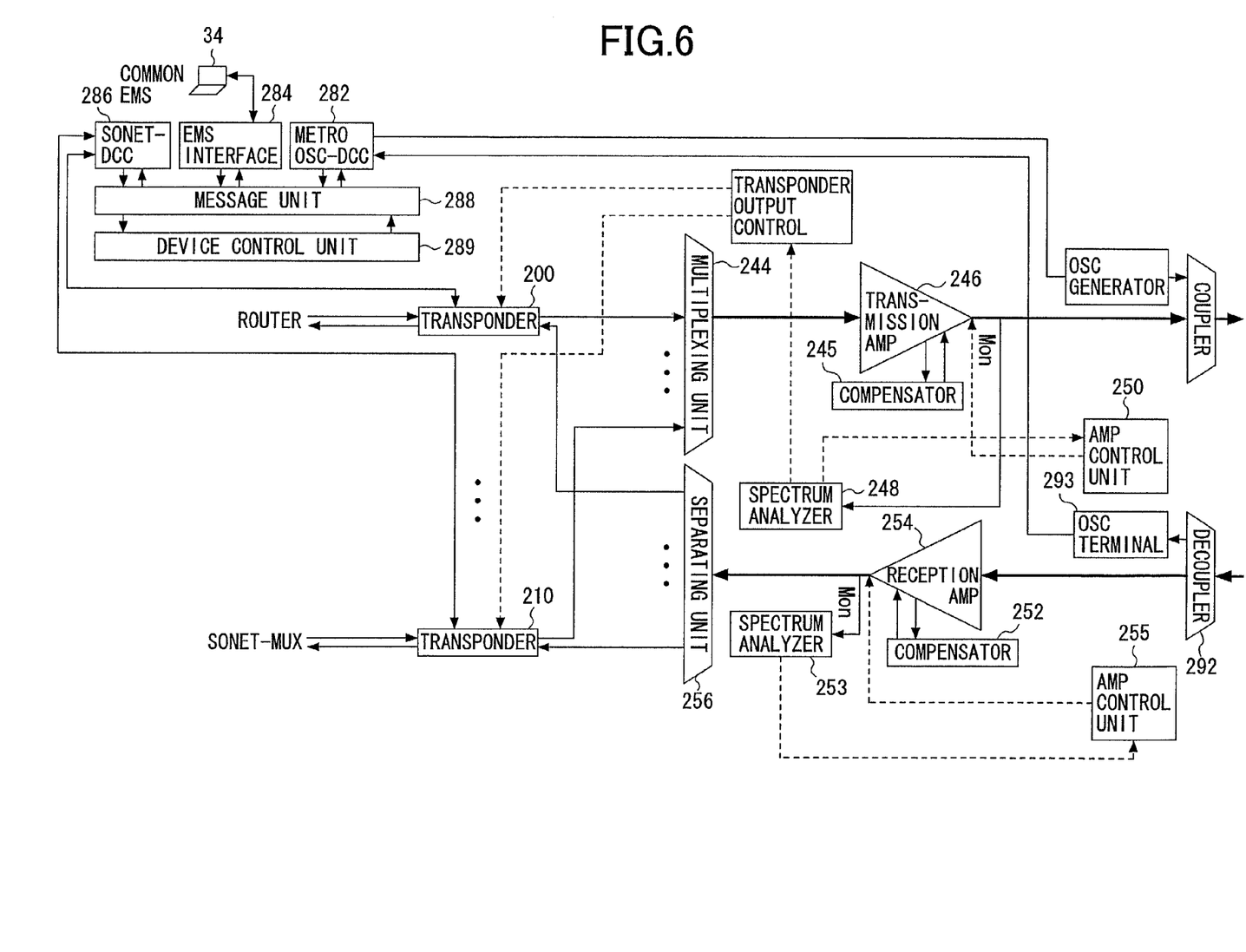
FIG. 6 is a block diagram showing a structure of a metro WDM terminal device.

FIG. 6 is a block diagram showing a structure of the metro WDM terminal device 28. A client signal transmitted by each wave from a router is supplied to a wavelength-multiplexing unit (a multiplexing unit) 244 through a transponder 200. A client signal transmitted by each wave from the SONET-MUX 32 is supplied to the wavelength-multiplexing unit 244 through a transponder 210. The wavelength-multiplexing unit 244 multiplexes wavelengths of the above client signals supplied from the router and the SONET-MUX 32. Subsequently, a WDM collective transmission amplifier (a transmission amp) 246 adjusts a level of a WDM signal obtained by multiplexing the wavelengths of the above client signals. Additionally, a plural-wavelengths collective dispersion compensator 245 (a compensator) compensates dispersion of the WDM signal for securing the next WDM transmission performance. The WDM signal is, then, transmitted to the long-haul WDM network.

An output level of the WDM collective transmission amplifier 246 is controlled by an amplifier control unit (an amp control unit) 250, based on a result of monitoring an output of the WDM collective transmission amplifier 246 by using a spectrum analyzer 248.

On the other hand, a WDM signal transmitted through the metro WDM network is supplied to a WDM collective reception amplifier (a reception amp) 254. Subsequently, a plural-wavelengths collective dispersion compensator (a compensator) 252 compensates dispersion of the WDM signal accumulated by the metro WDM transmission. Additionally, the WDM collective reception amplifier 254 adjusts a level of the WDM signal. The WDM signal whose dispersion is compensated and level is adjusted is, then, separated by a wavelength-separating unit (a separating unit) 256. An output level of the WDM collective reception amplifier 254 is controlled by an amplifier control unit (an amp control unit) 255, based on a result of monitoring an output of the WDM collective reception amplifier 254 by using a spectrum analyzer 253.

The wavelength-separating unit 256 separates the WDM signal by each wavelength, and outputs a separated signal through the transponder 200 to a client side (via the router), and through the transponder 210 to the SONET-MUX 32.

A description will now be given of collective network setting and management performed by the common EMS terminal device 34.

As shown in FIG. 4, each of the long-haul WDM terminal devices 20 and 21 further includes a long-haul WDM OSC-DCC (Optical Supervising Channel-Data Communication Channel) terminal unit (a long-haul OSC-DCC) 80, a metro WDM OSC-DCC terminal unit (a metro OSC-DCC) 82, an EMS interface terminal unit (an EMS interface) 84, a SONET-DCC terminal unit (a SONET-DCC) 86, a message processing/converting unit (a message unit) 88 and a device control unit 89. Additionally, the common EMS terminal device (a common EMS) 34 is connected to the EMS interface terminal unit 84.

The WDM-ADM device 22 shown in FIG. 5 includes a long-haul WDM OSC-DCC terminal unit (a long-haul OSC-DCC) 180, a metro WDM OSC-DCC terminal unit (a metro OSC-DCC) 182, an EMS interface terminal unit (an EMS interface) 184, a SONET-DCC terminal unit (a SONET-DCC) 186, a message processing/converting unit (a message unit) 188 and a device control unit 189. Additionally, the common EMS terminal device 34 is connected to the EMS interface terminal unit 184.

Additionally, the metro WDM terminal device 28 includes a metro WDM OSC-DCC terminal unit (a metro OSC-DCC) 282, an EMS interface terminal unit (an EMS interface) 284, a SONET-DCC terminal unit (a SONET-DCC) 286, a message processing/converting unit (a message unit) 288 and a device control unit 289. Additionally, the common EMS terminal device (a common EMS) 34 is connected to the EMS interface terminal unit 284.

In a case in which the common EMS terminal device 34 shown in FIG. 4 transmits a message written in a language such as a TL1 (Transactional Language 1) to the long-haul WDM terminal device 20 or 21, the message including provisioning information about the long-haul WDM terminal device 20 or 21, the message processing/converting unit 88 of the long-haul WDM terminal device 20 or 21 receives the message through the EMS interface terminal unit 84, and recognizes that a destination of the message is the device 20 or 21. The message processing/converting unit 88, then, converts a format of the message to a format in which a long-haul WDM terminal device can recognize the message. Subsequently, the device control unit 89 carries out setting and management of each unit included in the long-haul WDM terminal device 20 or 21, based on the message whose format is converted. Accordingly, the long-haul WDM terminal device 20 or 21 can set output wavelengths of a plurality of transponders, output levels of a plurality of WDM collective transmission amplifiers and the like.

In a case in which the common EMS terminal device 34 shown in FIG. 4 transmits a message written in a language such as the TL1 to the long-haul WDM terminal device 20 or 21, the message including provisioning information about the metro WDM terminal device 28 connected to the long-haul WDM terminal device 20 or 21, the message processing/converting unit 88 of the long-haul WDM terminal device 20 or 21 receives the message through the EMS interface terminal unit 84. Subsequently, the message processing/converting unit 88 recognizes that the message must be transmitted to the metro WDM terminal device 28, and the metro WDM terminal device 28 that is a destination of the message and is accommodated by the long-haul WDM terminal device 20 or 21. The message processing/converting unit 88, then, converts a format of the message so that the metro WDM terminal device 28 can recognize the message.

The metro WDM OSC-DCC terminal unit 82 generates an optical supervising channel and a data communication channel (OSC-DCC) for setting and management of the metro WDM terminal device 28, based on the converted message. This OSC-DCC is combined with other data as an OSC having a single wavelength, by an OSC generating unit (an OSC generator) 90. Subsequently, the OSC is combined with a main signal by a coupler 91, and transmitted as a WDM signal to the metro WDM terminal device 28.

A decoupler 292 of the metro WDM terminal device 28 separates the OSC for long-haul WDM transmission, from the WDM signal. Additionally, an OSC terminal unit (an OSC terminal) 293 separates the OSC-DCC from the OSC. The separated OSC-DCC is supplied to the message processing/converting unit 288 through the metro WDM OSC-DCC terminal unit 282. The message processing/converting unit 288 recognizes that the destination of the message is the metro WDM terminal device 28, and converts the format of the message so that the metro WDM terminal device 28 can recognize the message. Subsequently, the device control unit 289 carries out setting and management of each unit included in the metro WDM terminal device 28, based on the converted message.

In a case in which setting and management of the SONET-MUX 32 accommodated in the metro WDM terminal device 28 is performed, the message processing/converting unit 288 recognizes the OSC-DCC separated by the OSC terminal device 293 as a message that must be transmitted to the SONET-MUX 32, and, thus, converts a format of the message so that the SONET-MUX 32 recognizes the message.

The SONET-DCC terminal unit 286 generates an OSC-DCC for setting and managing the SONET-MUX 32, based on the converted message, and transmits the OSC-DCC to the SONET-MUX 32 through the transponder 210. Consequently, setting and management of the SONET-MUX 32 are performed, in accordance with the OSC-DCC.

Accordingly, the above-described steps achieve setting of output wavelengths of a plurality of transponders and output levels of a plurality of WDM collective transmission amplifiers included in the metro WDM terminal device 28 and the SONET-MUX 32.

In a case in which the common EMS terminal device 34 shown in FIG. 4 transmits a message written in a language such as the TL1 to the long-haul WDM terminal device 20 or 21, the message including provisioning information about the metro WDM terminal device 28 accommodated in the WDM-ADM device 22 carrying out the long-haul WDM transmission, the message processing/converting unit 88 of the long-haul WDM terminal device 20 or 21 receives the message through the EMS interface terminal unit 84. Subsequently, the message processing/converting unit 88 recognizes that a destination of the message is the metro WDM terminal device 28, and the metro WDM terminal device 28 as the destination of the message. Since the metro WDM terminal device 28 is accommodated in the WDM-ADM device 22, the message processing/converting unit 88 converts a format of the message so that the WDM-ADM device 22 can recognize the message.

The long-haul WDM OSC-DCC terminal unit 80 generates an OSC-DCC for long-haul WDM transmission, based on the message whose format is converted. The OSC-DCC for the long-haul WDM transmission is combined with other data as an OSC having a single wavelength, by the OSC generating unit 90. Subsequently, the OSC is combined with a main signal by the coupler 91, and is transmitted as a WDM signal to the WDM-ADM device 22.

A decoupler 192 of the WDM-ADM device 22 shown in FIG. 5 separates the OSC for the long-haul WDM transmission from the WDM signal. Additionally, an OSC terminal unit 193 separates the OSC-DCC from the OSC. This OSC-DCC is, then, supplied to the message processing/converting unit 188 through the long-haul WDM OSC-DCC terminal unit 180. The message processing/converting unit 188 recognizes that the message is to be transmitted to a metro WDM terminal device, and the destination of the message is the metro WDM terminal device 28 accommodated in the WDM-ADM device 22. Thus, the message processing/converting unit 188 converts the format of the message so that the metro WDM terminal device 28 can recognize the message.

The metro WDM OSC-DCC terminal unit 182 generates an OSC-DCC for a metro WDM terminal device, based on the message whose format is converted. This OSC-DCC for a metro WDM terminal device is combined with other data as an OSC having a single wavelength, by an OSC generating unit (an OSC generator) 194. Additionally, the OSC is combined with a main signal as a WDM signal by a coupler 195, and is transmitted to the metro WDM terminal device 28.

The decoupler 292 of the metro WDM terminal device 28 shown in FIG. 6 separates the OSC for the long-haul WDM transmission from the WDM signal. Additionally, the OSC terminal unit 293 separates the OSC-DCC from the OSC. The separated OSC-DCC is supplied to the message processing/converting unit 288 through the metro WDM OSC-DCC terminal unit 282. The message processing/converting unit 288 recognizes that the message is to be transmitted to the metro WDM terminal device 28, and converts the format of the message so that the metro WDM terminal device 28 can recognize the message. Subsequently, the device control unit 289 carries out setting and management of each unit included in the metro WDM terminal device 28, based on the message whose format is converted.

Accordingly, the above-described steps achieve setting of the output wavelengths of a plurality of transponders and the output levels of a plurality of WDM collective transmission amplifiers included in the metro WDM terminal device 28 and the SONET-MUX 32 accommodated in the metro WDM terminal device 28.

Now, a transmission path using a specific wavelength is provided between the routers 26 and 27, as shown in FIG. 3, a route of the transmission path starting from the router 26 through the metro WDM terminal device accommodated in the long-haul WDM terminal device 20, the long-haul WDM terminal device 20, the WDM-ADM device 22 and the metro WDM terminal device 28 accommodated in the WDM-ADM device 22, to the router 27.

The long-haul WDM terminal device 20 constantly monitors a WDM signal received from the WDM-ADM device 22. In a case in which the long-haul WDM terminal device 20 detects a failure to the specific wavelength such as a decrease in a reception level of the WDM signal, the long-haul WDM terminal device 20 searches through a wavelength management table stored in the common EMS terminal device 34, for a wavelength usable through all the sections of the route between the routers 26 and 27. Subsequently, the long-haul WDM terminal device 20 assigns the wavelength as a new specific wavelength (a newly assigned wavelength) used for the transmission path.

The long-haul WDM terminal device 20 notifies the metro WDM terminal device 28 accommodating the router 26 about the newly assigned wavelength, by using the metro WDM OSC-DCC terminal unit 82 shown in FIG. 4, and notifies the WDM-ADM device 22 about the newly assigned wavelength, by using the long-haul WDM OSC-DCC terminal unit 80. Additionally, the long-haul WDM terminal device 20 notifies the metro WDM terminal device 28 accommodating the router 27 about the newly assigned wavelength, by using the long-haul WDM OSC-DCC terminal unit 80 and a DCC for the metro WDM transmission, the DCC being converted by the WDM-ADM device 22.

The metro WDM terminal device 28 accommodating the router 27 changes output wavelengths of the transponders inside the metro WDM terminal device 28 to the newly assigned wavelength. The WDM-ADM device 22 for the long-haul WDM transmission changes a setting of the variable-separation-wavelength add/drop units 144 and 156 shown in FIG. 5, to accommodate the newly assigned wavelength. The long-haul WDM terminal device 20 changes a setting of the variable-separation-wavelength-separating unit 56 shown in FIG. 4, to output the newly assigned wavelength to the metro WDM terminal device 28 accommodating the router 26. The metro WDM terminal device 28 accommodating the router 26 receives the newly assigned wavelength as a signal to be transmitted to the router 26.

As described above, the long-haul WDM terminal device 20 can assign a new wavelength in the case in which the long-haul WDM terminal device 20 detects a failure to the specific wavelength such as a decrease in the reception level of the WDM signal.

Similarly, the WDM-ADM device 22 may constantly monitor a WDM signal received from the long-haul WDM terminal device 20. In a case in which the WDM-ADM device 22 detects a failure to the specific wavelength of the route such as a decrease in a reception level of the WDM signal, the WDM-ADM device 22 searches through the wavelength management table stored in the common EMS terminal device 34, for a wavelength usable through all the sections of the route between the routers 26 and 27. Subsequently, the WDM-ADM device 22 assigns the wavelength as a new specific wavelength (a newly assigned wavelength) used for the transmission path.

The WDM-ADM device 22 notifies the metro WDM terminal device 28 accommodating the router 27 about the newly assigned wavelength, by using the metro WDM OSC-DCC terminal unit 182 shown in FIG. 5, and notifies the long-haul WDM terminal device 20 about the newly assigned wavelength, by using the long-haul WDM OSC-DCC terminal unit 180. Additionally, the WDM-ADM device 22 notifies the metro WDM terminal device 28 accommodating the router 26 about the newly assigned wavelength, by using the long-haul WDM OSC-DCC terminal unit 180 and a DCC for the metro WDM transmission, the DCC being converted by the long-haul WDM terminal device 20.

The metro WDM terminal device 28 accommodating the router 27 changes the output wavelengths of the transponders inside the metro WDM terminal device 28 to the newly assigned wavelength. The WDM-ADM device 22 for the long-haul WDM transmission changes the setting of the variable-separation-wavelength add/drop unit 156 shown in FIG. 5, to drop the newly assigned wavelength. The metro WDM terminal device 28 accommodating the router 27 receives the newly assigned wavelength as a signal to be transmitted to the router 27.

As described above, the WDM-ADM device 22 can assign a new wavelength in the case in which the WDM-ADM device 22 detects a failure to the specific wavelength such as a decrease in the reception level of the WDM signal.

Next, it is assumed in the long-haul WDM terminal device 20 shown in FIG. 4 that an alarm message generated at the metro WDM terminal device 28 is transmitted to the message processing/converting unit 88 through the metro WDM OSC-DCC terminal unit 82 by use of an OSC-DCC for metro WDM transmission. The message processing/converting unit 88 recognizes the alarm message as a message that should be outputted to the common EMS terminal device 34, and the metro WDM terminal device 28 as an origin of the alarm message. It is assumed that the metro WDM terminal device 28 is accommodated in the long-haul WDM terminal device 20. Additionally, the message processing/converting unit 88 converts a format of the alarm message to a format recognizable by the common EMS terminal device 34 The alarm message whose format has been converted is transmitted with other messages to the common EMS terminal device 34 through the EMS interface terminal unit 84.

Next, it is assumed that an alarm message generated at the metro WDM terminal device 28 is transmitted to the WDM-ADM device 22 shown in FIG. 5 by use of the OSC-DCC for the metro WDM transmission. In this case, the alarm message is transmitted to the message processing/converting unit 188 through the metro WDM OSC-DCC terminal unit 182. The message processing/converting unit 188 recognizes the alarm message as a message that should be transmitted to the common EMS terminal device 34 connected to the long-haul WDM terminal device 20, and the metro WDM terminal device 28 as an origin of the alarm message. It is assumed that the metro WDM terminal device 28 is accommodated in the WDM-ADM device 22. Additionally, the message processing/converting unit 188 converts a format of the alarm message to a format recognizable by the long-haul WDM terminal device 20.

The long-haul WDM OSC-DCC terminal unit 180 generates an OSC-DCC for the long-haul WDM transmission, based on the alarm message whose format has been converted. This OSC-DCC for the long-haul WDM transmission is, then, combined with other data as an OSC having a single wavelength, by the OSC generating unit 194. Subsequently, the OSC is combined with a main signal by the coupler 195, and is transmitted to the long-haul WDM terminal device 20.

As described above, the alarm message generated by the metro WDM terminal device 28 accommodated in the WDM-ADM device 22 is transmitted to the long-haul WDM terminal device 20 by use of the OSC-DCC for the long-haul WDM transmission. This alarm message is supplied to the message processing/converting unit 88 through the long-haul WDM OSC-DCC terminal unit 80. The message processing/converting unit 88 recognizes the alarm message as a message that should be transmitted to the common EMS terminal device 34, and the metro WDM terminal device 28 as an origin of the alarm message.

Additionally, the message processing/converting unit 88 converts the format of the alarm message to a format recognizable by the common EMS terminal device 34. The alarm message whose format has been converted is, then, transmitted with other messages to the common EMS terminal device 34 through the EMS interface terminal unit 84. Accordingly, alarm monitoring for a WDM terminal device, a WDM-ADM device and a SONET device that compose a WDM network can be performed at one place.

The long-haul WDM terminal device 20 constantly monitors a WDM signal received from the metro WDM terminal device 28, in the network shown in FIG. 3. A description will now be given of a case in which the long-haul WDM terminal device 20 detects a change in a level (a reception level) of the received WDM signal, the change being caused by a change in a condition of an optical fiber or the like.

In the case in which the long-haul WDM terminal device 20 detects a change in the reception level, the long-haul WDM terminal device 20 notifies the metro WDM terminal device 28 about the change by using the OSC-DCC for the metro WDM transmission. The metro WDM terminal device 28 notified about the change automatically adjusts an output level of the WDM collective transmission amplifier 246 shown in FIG. 6 to be an appropriate value. Accordingly, the present invention can insure correct WDM transmission.

The WDM-ADM device 22 for the long-haul WDM transmission constantly monitors a WDM signal received from the metro WDM terminal device 28. In a case in which the WDM-ADM device 22 detects a change in a level (a reception level) of the received WDM signal, the change being caused by a change in a condition of an optical fiber or the like, the WDM-ADM device 22 notifies the metro WDM terminal device 28 accommodated in the WDM-ADM device 22 about the change by using the OSC-DCC for the metro WDM transmission. The metro WDM terminal device 28 notified about the change automatically adjusts an output level of the WDM collective transmission amplifier 246 shown in FIG. 6 to be an appropriate value. Accordingly, the present invention can insure correct WDM transmission.

According to the present invention, a wavelength-multiplexed client signal is accommodated in or is transmitted to a next-level long-haul WDM system without being separated. Thus, the present invention achieves elimination of a WDM-DEMUX and a transponder used for separating the client signal, and a transmission transponder used for accommodating the client signal in the next-level long-haul WDM system. Consequently, the present invention achieves accommodation of the client signal at low cost.

Additionally, by transmitting a wavelength-multiplexed client signal that should be transmitted to a distant place without separating the client signal individually, the present invention achieves elimination of a WDM-DEMUX and a transponder used for separating the client signal, and a transponder and a WDM-MUX used for transmitting the client signal to the distant place. Consequently, the present invention achieves transmission of the client signal at low cost.

Further, a common EMS can collectively carry out setting and management of an entire network, by exchanging a message among an OSC-DCC for long-haul WDM transmission used by an EMS interface or in a long-haul WDM network as a data link path, an OSC-DCC for metro WDM transmission used as a data link path in a metro WDM network, and a SONET-DCC used as a data link path in a SONET network.

According to the present invention as described above, the long-haul WDM terminal device 20 or 21 can multiplex wavelengths of a plurality of client signals received from the metro WDM terminal device 28 located at a distant place, to a wavelength of another client signal without separating the plurality of client signals by each wavelength, thereby achieving accommodation of a plurality of client signals whose wavelengths are multiplexed, at low cost.

Additionally, the long-haul WDM terminal device 20 or 21 can separate a first plurality of client signals to be transmitted to the metro WDM terminal device 28 from a second plurality of client signals without separating the first plurality of client signals by each wavelength, the wavelengths of the first plurality of client signals being multiplexed. Accordingly, the long-haul WDM terminal device 20 or 21 can accommodate the first plurality of client signals whose wavelengths are multiplexed at low cost.

The common EMS terminal device 34 can change a wavelength of each client signal transmitted by the long-haul WDM terminal device 20 or 21, the metro WDM terminal device 28, the WDM-ADM device 22, and a SONET device (the SONET-MUX 32) included in a WDM network. Thus, the WDM-ADM device 22 can add a plurality of client signals received with wavelengths of the plurality of client signals being multiplexed from the metro WDM terminal device 28 located at a distant place, to another client signal without separating the plurality of client signals by each wavelength.

Additionally, the common EMS terminal device 34 can monitor the long-haul WDM terminal device 20 or 21, the metro WDM terminal device 28, the WDM-ADM device 22, and the SONET device included in the WDM network, for an alarming condition. Further, the common EMS terminal device 34 can automatically adjust an output level of a signal from each of the long-haul WDM terminal device 20 or 21, the metro WDM terminal device 28, the WDM-ADM device 22, and the SONET device, to an appropriate value in real-time.

The WDM-ADM device 22 can add wavelengths of a plurality of client signals received from the metro WDM terminal device 28 located at a distant place, to a wavelength of another client signal without separating the plurality of client signals by each wavelength, thereby achieving accommodation of a plurality of client signals whose wavelengths are multiplexed, at low cost.

Additionally, the WDM-ADM device 22 can drop a first plurality of client signals to be transmitted to the metro WDM terminal device 28 from a second plurality of client signals without separating the first plurality of client signals by each wavelength, the wavelengths of the first plurality of client signals being multiplexed, thereby achieving accommodation of the first plurality of client signals whose wavelengths are multiplexed at low cost.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2001-088565, filed on Mar. 26, 2001, the entire contents of which are hereby incorporated by reference.

What is claimed is:

1. A WDM (Wavelength Division Multiplex) terminal device located in a WDM network, said WDM terminal device comprising:
   a first compensator that collectively optically compensates dispersion of each wavelength of a first plurality of wavelength division multiplexed optical client signals;
   a transmission amplifier that collectively adjusts levels of said first plurality of wavelength division multiplexed optical client signals;
   a multiplexing unit that receives the first plurality of wavelength division multiplexed optical client signals as a WDM signal, and individually receives at least one other optical client signal provided to the multiplexing unit through at least one transponder, and that wavelength division multiplexes together the received WDM signal and the individually received at least one other optical client signal, to thereby output a wavelength division multiplexed light which comprises the first plurality of optical client signals and the individually received at least one other optical client signal;
   a second compensator that receives a wavelength division multiplexed signal comprising a second plurality of optical client signals and a third plurality of optical client signals, and collectively compensates dispersion of the second plurality of optical client signals and the third plurality of optical client signals in the wavelength division multiplexed signal;
   a reception amplifier that collectively adjusts levels of the second plurality of optical client signals and the third plurality of optical client signals in the wavelength division multiplexed signal; and
   a separating unit that receives the wavelength division multiplexed signal comprising the second plurality of optical client signals and the third plurality of optical client signals, separates the second plurality of optical client signals from the third plurality of optical client signals, while keeping wavelengths of the second plurality of optical client signals multiplexed together,
   wherein the separating unit transmits the separated second plurality of optical client signals to a place which is different from where the third plurality of optical client signals is transmitted, while keeping the wavelengths of the second plurality of optical client signals multiplexed.

2. A WDM-ADM device located in a WDM network, said WDM-ADM device comprising:
   a first compensator that collectively optically compensates dispersion of each wavelength of a first plurality of wavelength division multiplexed optical client signals;
   a transmission amplifier that collectively adjusts levels of said first plurality of wavelength division multiplexed optical client signals;
   an adding unit that receives the first plurality of wavelength division multiplexed optical client signals as a WDM signal, and individually receives at least one other optical client signal provided to the adding unit through at least one transponder, and that adds together the received WDM signal and the individually received at least one other optical client signal;
   a second compensator that receives a wavelength division multiplexed signal comprising a second plurality of optical client signals and a third plurality of optical client signals, and collectively compensates dispersion of the second plurality of optical client signals and the third plurality of optical client signals in the wavelength division multiplexed signal;
   a reception amplifier that collectively adjusts levels of the second plurality of optical client signals and the third plurality of optical client signals in the wavelength division multiplexed signal; and
   a dropping unit that receives the wavelength division multiplexed signal comprising the second plurality of optical client signals and the third plurality of optical client signals, drops the second plurality of optical client signals from the third plurality of optical client signals, keeping wavelengths of the second plurality of optical client signals multiplexed together,
   wherein the dropping unit transmits the dropped second plurality of optical client signals to a place which is different from where the third plurality of optical client signals is transmitted, while keeping the wavelengths of the second plurality of optical client signals multiplexed.

3. An apparatus comprising:
   a dispersion compensator that collectively compensates for dispersion of a first plurality of wavelength division multiplexed optical client signals as a WDM signal;
   an amplifier that collectively adjusts levels of the first plurality of wavelength division multiplexed optical client signals as the WDM signal;

a multiplexing unit that receives the first plurality of wavelength division multiplexed optical client signals as the WDM signal from the amplifier, and individually receives at least one other optical client signal provided to the multiplexing unit through at least one transponder, and wavelength division multiplexes together the received WDM signal and the individually received at least one other optical client signal, to thereby output a wavelength division multiplexed light which comprises the first plurality of wavelength division multiplexed optical client signals and the individually received at least one other optical client signal; and a separating unit that receives a wavelength division multiplexed signal comprising a second plurality of optical client signals and a third plurality of optical client signals, separates the second plurality of optical client signals from the third plurality of optical client signals, while keeping wavelengths of the second plurality of optical client signals multiplexed together, wherein the separating unit transmits the separated second plurality of optical client signals to a place which is different from where the third plurality of optical client signals is transmitted, while keeping the wavelengths of the second plurality of optical client signals multiplexed.

* * * * *